S. D. Bowker.
Miter Box.

No. 93,589. Patented Aug. 10, 1869.

United States Patent Office.

SETH D. BOWKER, OF KANSAS CITY, MISSOURI.

Letters Patent No. 93,589, dated August 10, 1869.

---

IMPROVEMENT IN MITRE-BOX.

---

The Schedule referred to in these Letters Patent and making part of the same.

---

*To all whom it may concern:*

Be it known that I, SETH D. BOWKER, of Kansas City, Jackson county, Missouri, have made certain new and useful Improvements in Mitre-Boxes; and I do hereby declare that the following is a full and true description thereof, reference being had to the accompanying drawings, and to the letters of reference marked thereon.

This invention relates to the manner of connecting a pivoted saw-guide with the table of the mitre-box, and to the manner of adjusting the position of said guide to give the required mitre-angle; and said invention relates also to the arrangement of adjustable slides with the table, so that crooked or curved stuff may be readily adjusted and held upon the table.

Figure 1:
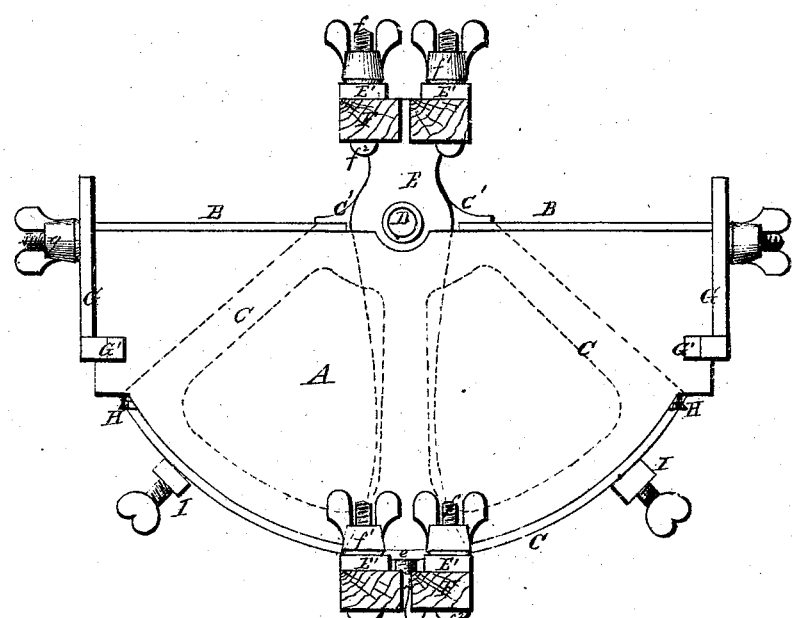
Figure 2:
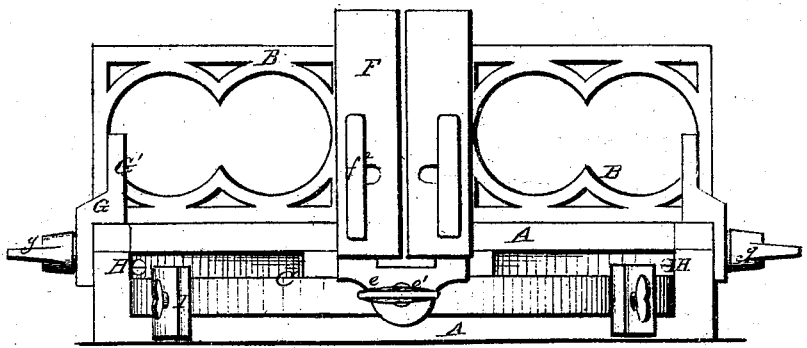
Figure 3:
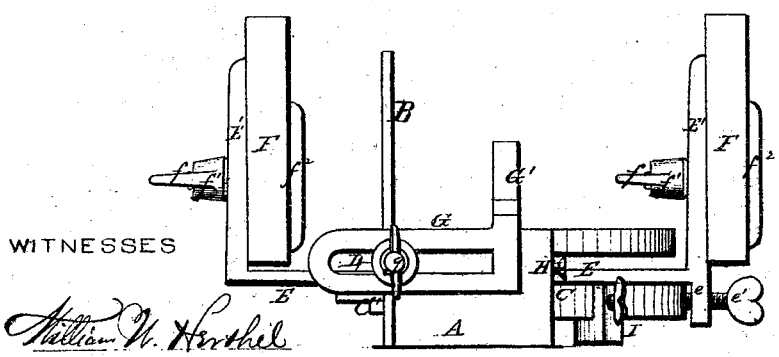

To enable those herein skilled to make and use my said invention, I will now more fully describe the same, referring to the accompanying Figure 1 as a plan; to
Figure 2 as a front view; and to
Figure 3 as a side view.

I form my said box with a table or base-plate, A, by which its rests upon a work-bench or other support.

Upon the rear edge of said table, I secure the back plates or rests B, these being usually light metallic plates, having a central passage for the saw.

Within the base-plate A, and secured thereto, I arrange the metallic sector C, the apex whereof, C', receives the pivot-bolt D, about which the radius-plate E turns freely.

The front or outer edge of the sector C is curved as an arc of the circle whose centre is the axis of the bolt D, and the radius-plate runs forward and projects sufficiently beyond said sector-face to allow the rib $e$ to deflect from the radius-plate, and receive a set-screw, $e'$, by which the plate E may be secured to the sector C, and thus be securely held in position, with reference to the table A.

The rear end of the radius-plate E projects somewhat beyond the pivot D.

On both ends of the radius-plate E, I arrange standards, E', there being two for each end. Said standards have the set-screw $f$, securing the saw-guides F, between which the saw is inserted, and which act to guide the saw in cutting the required mitre.

The saw-guides F, I prefer to make of hard wood, placed so that the passage between them shall be in the direction of the grain, thus reducing the liability to laceration or damage of the edges in inserting or operating the saw.

The set-screws $f$ have the usual thumb-nuts $f^1$, and are formed with elongated heads, $f^2$, to give a large bearing-surface on the guide-pieces F.

In order to adjust the interstice between the guide-pieces F to the different sizes of saws, the hole through which the screw $f$ passes in the said guides is elongated, as shown in fig. 2.

The stuff to be mitred is placed upon the table A, and rests against the back plates B.

In order that curved or crooked pieces may be better supported, I arrange, at each end of the table A, the slide-rests G, which have proper slots to admit of adjustment by the set-screw $g$.

The vertical shank G', of said rests, is shaped to move on the upper table-surface, and projects sufficiently above said surface to furnish the required support to the stuff.

In the usual applications of mitre-boxes, the angle of the cut is generally forty-five degrees. In order that this angle may be readily and accurately obtained, I have placed the wood-screws H at the end of the circular sector-surface in the table-plate A.

By said screws the radial movement of the radius-plate E is limited to ninety degrees, and if the stuff to be cut rests against the back plates B, the angle cut when the radius-plate is at either end of its swing will be forty-five degrees.

If, in use, the parts should become disarranged, and the angle be changed, then by simply moving the screws H in or out, a readjustment may readily be made.

If an intermediate angle be required, I use the clamps I, which are secured by their set-screws to the outer edge of the sector, in the position required to give the saw, between the guides F, the proper angle.

It will be found that by the use of the devices thus described, mitred work of every description may be readily executed with true and well-defined edges, and close fit when put together.

If thought advantageous, the front circular face of the sector C may be divided, to indicate in degrees the angles corresponding to the positions of the radius-plate.

Having thus fully described my said invention,
What I claim, is—

The arrangement of the table A, back rests B, and slide-rests G G', with the sector C, radius-plate E, and saw-guides F, when constructed to operate substantially as and for the purposes set forth.

S. D. BOWKER.

Witnesses:
  GEO. P. HERTHEL, Jr.,
  WILLIAM W. HERTHEL.

*Assignor to himself & David J. Alger of same place.*